Feb. 14, 1950   S. W. SEELEY   2,497,841
ANGLE MODULATION DETECTOR
Filed Sept. 7, 1945   3 Sheets-Sheet 1

Fig. 6a.
ON RESONANCE WITH MODULATION

Fig. 6b.
OFF RESONANCE WITH MODULATION

INVENTOR
STUART W. SEELEY
BY H. S. Grover
ATTORNEY

Feb. 14, 1950 S. W. SEELEY 2,497,841
ANGLE MODULATION DETECTOR
Filed Sept. 7, 1945 3 Sheets-Sheet 2

INVENTOR
STUART W. SEELEY
BY J. H. S. Grover
ATTORNEY

Feb. 14, 1950 S. W. SEELEY 2,497,841
ANGLE MODULATION DETECTOR
Filed Sept. 7, 1945 3 Sheets-Sheet 3

INVENTOR
STUART W. SEELEY
BY
ATTORNEY

Patented Feb. 14, 1950

2,497,841

UNITED STATES PATENT OFFICE 2,497,841

ANGLE MODULATION DETECTOR

Stuart W. Seeley, Roslyn Heights, N. Y., assignor to Radio Corporation of America, a corporation of Delaware Application September 7, 1945, Serial No. 614,956

31 Claims. (Cl. 250—27)

My present invention relates generally to detectors of angle modulated carrier waves which are insensitive to amplitude variations, and more particularly to an improved circuit for deriving the modulation from a frequency modulated (FM), or phase modulated (PM), carrier wave without allowing co-existent amplitude modulation (AM) variations to result in substantial detector output potentials.

As explained in my application, Serial No. 599,343, filed June 14, 1945, in the past there have been provided various methods of detecting angle modulated carrier waves without response to undesired amplitude variations. By "angle modulation" is meant either FM or PM, or hybrid forms of modulation possessing characteristics common to both of them. In the generation, transmission and reception of angle modulated waves such undesired AM effects may come from the transmitter directly, may be due to interfering impulses, or may be caused by lack of uniform gain over the signal selector pass band. In prior detection systems which were inherently immune to such undesired AM effects the means employed was either relatively uneconomical as compared to the cost of a special amplitude limiter stage prior to the detector, or the degree of immunity to undesired AM effects was insufficient.

In the aforesaid application it was explained that application of my invention to a known form of balanced FM detector of the general type disclosed and claimed in my U. S. Patent No. 2,121,103, granted June 21, 1938, involved reversal of one of the diode rectifiers. Such reversal resulted in the rectified direct current voltages across the diode load resistors, now in series, becoming additive, instead of providing zero direct current voltage at the output point in response to impression on the input of energy of accurately centered frequency. The additive voltage was either positive or negative depending on which end of the series-connected load resistors was grounded. The ungrounded end of the series-related load resistors was then established at a relatively fixed potential for modulation signal frequencies whereby substantially no modulation voltage could exist between the opposite ends of the load resistors. In effect, then, the load resistors were in parallel to ground for modulation voltage, but in series for direct current voltage. The tap between the two load resistors, or a variable tap on either one, served as the modulation voltage output point. The direct current voltage across the series-connected load resistors could be fixed in a predetermined manner, so that the direct current voltage could not vary substantially at a modulation rate. There was thereby established a threshold value below which no detection of any kind could occur.

It is an important object of my present invention to provide an improved angle modulation detector of the general type disclosed and claimed in the aforesaid application. From one viewpoint of my present invention, I have provided an FM detector which produces output only in the presence of a variation in the ratio of the signals applied to the respective diode rectifiers, whereas little or no output results from undesired interfering or "off-tune" signals. Decreased interferences from adjacent channel signals, and markedly reduced side responses as the desired FM signal is tuned off resonance, are outstanding features of the present FM detector circuit.

A more specific object of my present invention is to provide an FM detector consisting of a pair of rectifiers having but a single direct current path connecting said rectifiers in series-aiding polarity thereby deriving the benefits to be obtained from maintaining identical direct currents in each of the two rectifiers.

More specific objects of my invention will appear in the following detailed description of various embodiments of the basic features, it being pointed out that my present balanced FM detector system, substantially immune to AM effects, has important applicability to FM receiver construction.

Other objects and features of the invention will best be understood by reference to the following description, taken in connection with the drawings, in which I have indicated diagrammatically several circuits whereby my invention may be carried into effect.

Figure 1:
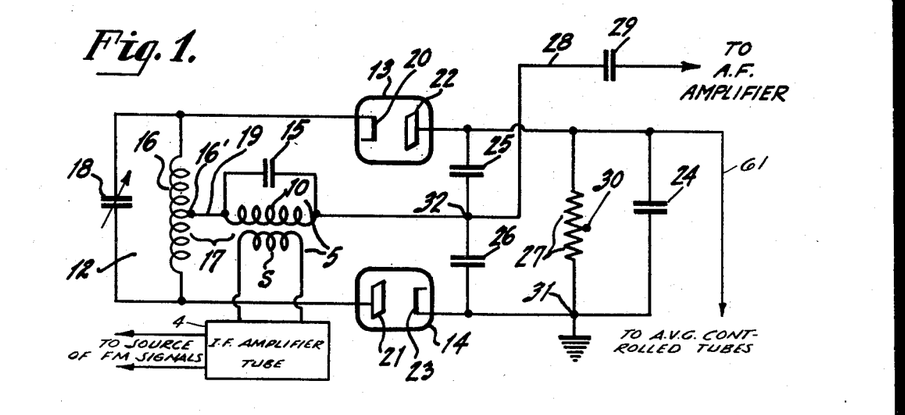
Fig. 1 is a schematic circuit diagram of an FM detector embodying my invention.

Referring now to the accompanying drawings, wherein like reference characters in the several figures designate similar circuit elements, there is shown in Fig. 1 a detector network of an FM receiver of the superheterodyne type. The detector is constructed in accordance with my present invention. While my invention is readily incorporated in any form of receiver of FM waves, I prefer to explain its functioning in connection with a superheterodyne receiver, since such a system is widely used at present. As previously explained, the present invention is not restricted to reception of FM waves, since phase modulated carrier waves could be received as well. An FM wave is produced at the FM transmitter by deviating the carrier wave relative to its mean frequency to an extent proportional to the amplitude of the modulating waves and independent of the modulating frequency. A PM wave differs in having a frequency deviation which increases with modulating frequency. The generic expression, "angle modulation" is, also, intended to include a modulated wave of preferably constant amplitude wherein the modulation is neither pure FM nor pure PM, but contains components resembling one or both of them, and is, therefore, a hybrid modulation.

In the present application it is assumed, by way of specific example, that the receiver is designed to operate in the FM broadcast band of 42-50 megacycles (mc.), and that each transmitter radiates an FM wave having a maximum frequency deviation up to ±75 kilocycles (kc.) with respect to the normal transmitter frequency. These are the assigned frequency values of the present day FM broadcast band, and are used herein merely by way of illustration. The receiver may include any desired form of signal collector, as, for example, a dipole. The collected FM signal waves may be applied to a suitable converter for reduction of the mean frequency value without change of the deviation. The converter may be of any desired construction, and is preferably preceded by one or more stages of selective high frequency amplification. Suitable signal selector circuits, usually employing a variable condenser or adjustable inductor, are employed for adjustment to receive signals from a desired FM station. The signal selector circuits will, of course, preferably be adjusted accurately to resonate the various adjustable selector circuits to the center, or mean, frequency of the desired FM station.

In a superheterodyne receiver the converter is fed with oscillations from a local oscillator whose tank circuit includes an adjustable reactance device, usually a variable condenser or adjustable inductor. The latter is customarily adjusted concurrently with the aforesaid selector devices so that the tank circuit will be tuned to a local oscillation frequency differing from the desired carrier frequency by the operating intermediate frequency (I. F.) The selective circuits of, and preceding, the converter may on the other hand be of the fixedly tuned type, if desired. The intermediate frequency is usually chosen from a range of 2 to 15 mc., by way of example, 8.25 mc. Any suitable actuating mechanism may be used for operating the station selecting devices. The converter may use the well-known pentagrid tube, or it may use separate oscillator and mixer tubes. These various circuits and circuit components are very well known to those skilled in the art of radio communication, and need only be briefly referred to.

The I. F. amplifier network may embody one or more amplifier tubes selectively tuned to the operating I. F. value of 8.25 mc. Of course, all signal transmission circuits between the signal collector and the demodulator, or detector, will be so constructed as to pass efficiently a band at least 150 kc. wide. It is, also, usual to design the signal transmission circuits to have a pass band of approximately 200 kc. in width to provide for reasonable tolerances, such as oscillator frequency drift and the like. The output transformer feeding the final I. F. amplifier tube usually has its primary and secondary circuits each tuned to the operating I. F. value.

One of the reasons in the past for employing an amplitude limiter prior to the discriminator section (or FM translating network) of the demodulator to reduce undesired AM effects on the carrier wave, was to avoid the necessity for critical tuning to the exact center, or carrier, frequency of a desired FM wave. As explained in my aforesaid application, in my present system there need be no special amplitude limiter stage employed prior to the detector circuit, since the detector itself is substantially immune to amplitude variations of the received FM signals. Hence, the I. F. amplifier tube immediately preceding the detector circuit may possess normal and full gain, which is the reverse of the usual operating condition for an amplitude limiter. Also since no limiter is required, a receiver utilizing the present ratio detector need not have the high I. F. amplifier gain heretofore found necessary in commercial practice in order to assure attainment of a threshold value of signal strength for operation of a limiter.

The discriminator input network of my present FM detector comprises coupled primary and secondary circuits denoted by numerals 5 and 12 respectively. The input coil S is indicated as part of the primary circuit. While any known and suitable discriminator may be utilized to provide the energizing signal voltages for rectifiers 13 and 14, I prefer to explain the present circuit action on the basis of the discriminator circuit of Fig. 1. The discriminator network is generally of the type shown and claimed in my aforesaid patent. In general, it is desired to employ a network constructed and arranged to derive from angle modulated waves a pair of voltages whose relative amplitude vary in accordance with the angular deviations of the waves with respect to a predetermined reference condition (whether phase or frequency).

The I. F. amplifier tube, immediately preceding the detector and the circuit 5 are parts of the receiver serving as a source of received waves to the discriminator section of my detector circuits. Wherever in the appended claims I have recited "a source of angle modulated carrier waves" or "a source of frequency modulated signals" or "a source of frequency modulated carrier waves" or the like, I refer to a part or parts of the receiver, e. g. such I. F. amplifier tube and circuit 5, supplying the angle modulated or frequency modulated waves to the discriminator. Likewise, in reciting "means for impressing on the respective rectifiers carrier frequency voltages," or the like, I refer to parts of the receiver preceding the rectifiers.

Considering the specific illustrative embodiment of Fig. 1, coil 10 is shunted by condenser 15 to provide a parallel resonant circuit tuned to the operating I. F. Coils S and 10 are wound so as to have a very high coefficient of coupling and for simplification of the analysis the coefficient of coupling may be considered to be unity. Then, any impedance across one coil will appear unchanged across the other, and the impedance appearing across both may be lumped and considered to be across only one. Condenser 15 need not be a physical capacitor as such but may be the sum of the capacitances appearing across coils S and 10. It is composed of the output capacitance of the prior tube connected to coil S, the diode rectifier capacitances and the various stray capacitances to ground of the circuit elements. In a typical case they totaled 25 mmf. (micro-micro-farads).

The secondary coil 16 is coupled to primary coil 10, and therefore also to coil S in the output circuit of I. F. amplifier tube 4, as indicated by numeral 17, and coil 16 is shunted by condenser 18. The resonant secondary circuit 12, including coil 16 and condenser 18, which constitute reactance elements of the discriminator network, is tuned to substantially the resonant frequency of the primary circuit 5. Each of coils 10 and 16 may be of the known inductance trimmer type, or capacity tuning may be used. Specifically, iron cores or slugs may be used for adjusting the inductance values of the respective coils 10 and 16, if coil 16 is so arranged that varying the slug does not unbalance the two halves of the coil. The high alternating potential side of coil 10 is connected by a lead 19 to midpoint 16' of coil 16 thus establishing the mid-point at the same alternating potential as the high potential side of primary circuit 5.

Rectifiers 13 and 14 are shown, by way of specific example, as electron discharge devices of the diode type. It is to be clearly understood that the diodes may have their electrodes embodied in a common tube envelope, as in the 6H6 type tube. Applicant further recognizes that in the practice of his invention other forms of two-electrode rectifiers may be used in place of diode vacuum tubes, and his claims assume that other suitable forms of two-electrode rectifiers can correctly be said to have an anode and a cathode. The cathode 20 of diode 13 is connected to the upper terminal, as diagrammatically shown, of condenser 18 and to the upper end of coil 16, whereas the anode 21 of diode 14 is connected to the lower terminal of condenser 18 and to the lower end of coil 16. The anode 22 of diode 13 and the cathode 23 of diode 14 are directly connected by condenser 24 shunted by a resistor 27 having a mid-point indicated at 30. The cathode 23 and the corresponding terminal of condenser 24 are established at ground potential at point 31. The magnitude of the condenser 24 is chosen so that the anode 22 of diode 13 is at ground potential with respect to modulation frequencies, i. e., audio frequency, as well as for I. F. Grounding point 31 provides a direct current negative voltage at the anode 22 of diode 13 which may be used for automatic gain control. Alternately, if desired, point 30, or even the anode 22 of diode 13 may be connected to ground.

The lead 61 connected to the anode 22 of diode 13 and the upper end of resistor 27 indicates diagrammatically a conventional automatic gain control, more often called an AVC (automatic volume control) circuit. This lead is conventionally connected to the control grids of signal transmission tubes to reduce the overall amplification of the vacuum tube system as the strength of the carrier wave increases, and vice versa. As will be manifest from the foregoing description of my invention, the AVC voltage, which is stabilized by condenser 24 against audio frequency variations, is automatically adjusted to the average strength of the signal impressed upon the discriminator circuits. The tube immediately preceding the discriminator input network of the detector circuit may be a normal I. F. amplifier giving full output except as it may be controlled by the AVC action.

Unlike my aforesaid patent application, the diode rectifiers are not directly shunted by respective load resistors. The anode 22 of diode 13 is connected to grounded cathode 23 by a pair of series-arranged condensers 25 and 26. Each of these condensers 25 and 26 has a relatively low impedance to I. F. currents, and they function as I. F. bypass condensers. These condensers may also serve to provide the proper amount of de-emphasis in the audio signal if they have the proper reactance to audio frequency currents. The primary coil 10 has its right hand end, or terminal, connected to the junction of condensers 25 and 26. Hence, the right hand terminal of coil 10 is at ground potential for I. F. currents, since the condenser 26 connects it to ground. In other words, condenser 26 provides a ground connection for the discriminator network. The coil S is assumed to be coupled, as previously described, to primary coil 10 thereby to feed I. F. signals from the FM signal source to primary circuit 5.

It can be seen that the diodes 13 and 14 are arranged in reverse relation relative to the connection in a conventional FM detector circuit of the type employing balanced detector circuit diodes. The detector circuit is completed by the above-mentioned resistor 27 and condenser 24. The modulation voltage, in this case the desired audio frequency modulation signal voltage, is taken off by connecting lead 28 to the low I. F. potential end of primary coil 10, i. e., the junction 32 of condensers 25 and 26, which act as load impedances across which the modulation frequency voltages are derived, the point 32 having the modulation frequency potential of the circuit on the input side of the rectifiers and the circuit on the output side of the rectifiers being grounded for such voltages. Condenser 29 is an audio frequency coupling condenser, and is inserted in the lead 28 to the input grid of the following audio frequency amplifier tube (not shown). Of course, one or more audio amplifier tubes may be employed, and the amplified audio frequency signals may be reproduced in any suitable manner, as by a loud speaker.

Figures 2, 6A, 6B:
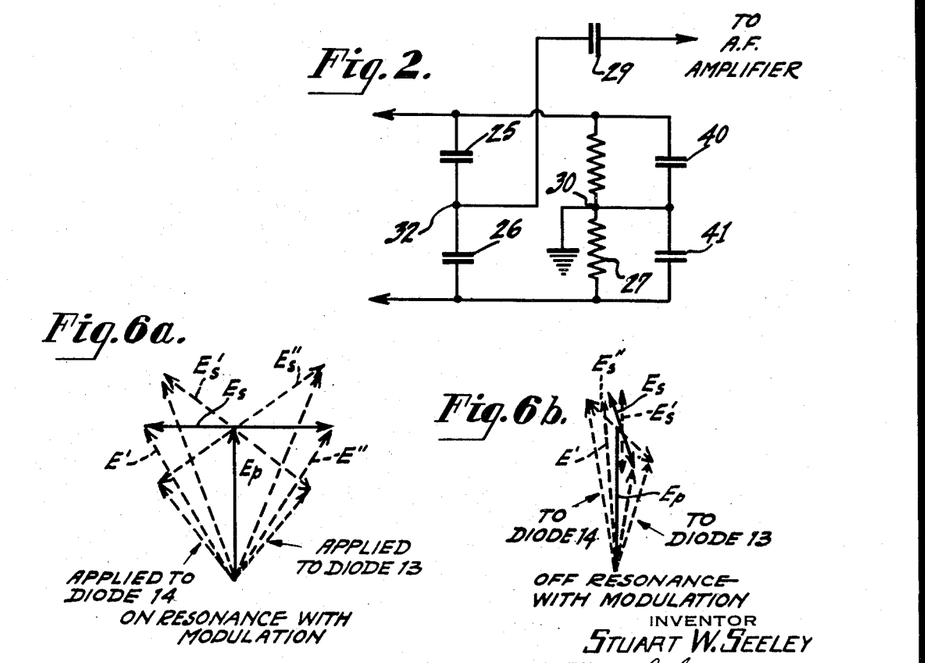
Fig. 2 shows a modified circuit arrangement for the detector output circuit.
Figs. 6a and 6b respectively show different vector relations between the primary and secondary voltages of the discriminator input network of the detector.

Either point 30 on resistor 27 or point 31 may be grounded, and the audio signal output taken off at point 32 at the junction of condensers 25 and 26. No resistance (direct current) between point 32 and either of points 30 or 31 is necessary. If point 30 is grounded, it may be desirable to use balanced audio bypass condensers 40 and 41 across the resistor 27. The junction of the condensers 40 and 41 is connected to point 30. This modification is shown in Fig. 2.

I have found that if no direct current path is connected from point 32 to either of points 30 or 31, or if the impedance of that path is very high compared to the load resistor 27, the direct current through the two diodes 13 and 14 is forced to be equal regardless of whether the received FM signal is accurately tuned in, or is off-resonance. This action provides substantial noise reduction. My present FM detector circuit has but a single direct current path connecting the diode rectifiers in series-aiding polarity. Thus, resistor 27 is included in such a path. The resistor is shunted by a condenser (capacity 24) which acts to inhibit changes in the voltage drop across resistor 27 at a modulation frequency rate. The condenser 24 in conjunction with resistor 27 thus acts as a voltage or potential source constant against amplitude variations at modulation frequencies by maintaining constant against such variations the potential produced by rectification of the frequency modulated or other angle modulated waves.

The single direct current path mentioned above may be referred to, in other words, as a closed loop for flow of uni-directional currents, such loop being formed by a circuit on the input side of the rectifiers connecting the cathode 20 of rectifier 13 to the anode 21 of rectifier 14, the rectifiers themselves, and a circuit on the output side of the rectifiers connecting anode 22 to cathode 23 and including resistance 27. As shown in Fig. 1, the circuit on the input side of the rectifiers may be said to be constituted by the coil 16 of the discriminator and the connections for impressing voltages from the discriminator on the rectifiers. My invention is not limited to such arrangement of the circuit portion of the closed loop on the input side of the rectifiers, as will clearly appear from Fig. 7 in which the direct current connection from cathode 20 of rectifier 13 to anode 21 of rectifier 14 goes through diodes 108 and 109.

Before describing in detail the electrical relations existing in the present FM detector circuit, there will be explained the manner in which the discriminator input network of the detector functions, reference specifically being made to Fig. 6a. It is first assumed that the FM signals applied to the primary circuit 5 are instantaneously at the mean or carrier frequency of 8.25 mc. The primary signal energies applied to the two diodes will be of like phase. However, cathode 20 and anode 21 are connected to opposite ends of coil 16. Due to the coupling 17 between tuned circuits 5 and 12, there will be a 90 degree phase shift between the primary and the secondary circuit voltages when the instantaneous carrier frequency is at the resonant, or center, value.

Accordingly, the secondary signal voltage will be applied to cathode 20 and anode 21 from the respective ends of coil 16 in opposite phase, but in each case in phase quadrature with the primary signal voltage. It follows, therefore, that the resultant signal voltages applied to cathode 20 and anode 21 will be equal at the carrier frequency, and the rectified voltages will be of equal magnitude. In Fig. 6a, I have portrayed the vector relations which exist at the instantaneous carrier frequency between the primary voltage $E_p$ and each half of the total secondary voltage $E_s$. The resultant voltages applied to the two diodes are respectively designated by the dashed arrows indicated E' and E''.

If at some later instant the FM signals have a frequency different from the resonant frequency of circuit 12, there will occur a phase shift of the signal energy transmitted through the transformer 10, 16 which is greater or less than 90 degrees, depending on the direction and the extent of frequency difference between the instantaneous frequency of the FM signals and the predetermined resonant frequency of the tuned circuits 5 and 12. In Fig. 6a, I have shown the vector relations corresponding to such a frequency deviation. It will be seen that the total secondary voltage $E_s$ has undergone an angular shift ($E'_s$) relative to the primary voltage. The resultant voltage E' is now greater than the other resultant voltage E''. This means that there will be applied to the diodes 13 and 14 resultant signal voltages of different magnitudes, and therefore, the rectified voltages will be of different magnitudes. If the frequency of the FM signals at circuit 5 deviated to the opposite side of center frequency, resulting in the angular position ($E''_s$) for $E_s$ shown by the dashed lines in Fig. 6a, then vector E'' would be longer than vector E'. Fig. 6a, therefore, shows the way the vector voltages applied to diodes 13 and 14 will vary with modulation. Where I recite in the appended claims or any of them "a pair of signal voltages" and "means for applying each of said pair of voltages to a respective rectifier," or employ like language, the meaning is that one of the voltages is applied to one of the rectifiers and the other of the voltages is applied to the other rectifier.

Figure 3:
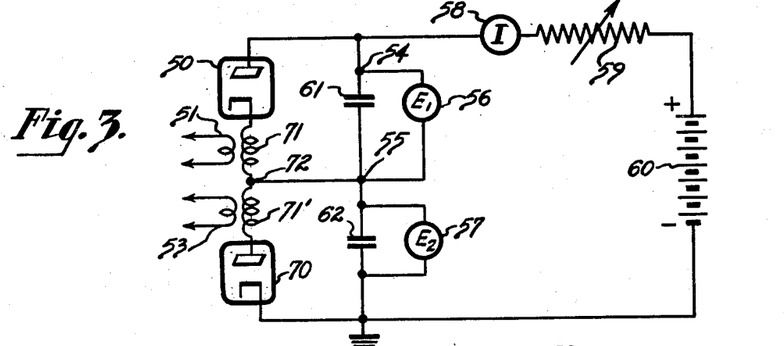
Figs. 3, 4, and 5 respectively illustrate analytical circuits employed in explaining the operation of the present invention.

Considering specifically the circuit arrangement shown in Fig. 3, which is presented only for the purpose of illustrating part of a theoretical explanation and is related to the circuit of Fig. 1 only to that extent, the numeral 60 designates a direct current voltage source, such as a battery, which is assumed to be extremely high in comparison with the direct current potentials developed across the diodes 50 and 70. The cathode of diode 50 is shown connected to the anode of diode 70 through two like coils 71 and 71' whose midpoint 72 is connected to the junction 55 of series-arranged condensers 61 and 62. The cathode of diode 70 is grounded, and each of condensers 61 and 62 is shunted by respective D. C. volt meters 56 and 57. The voltage reading of meter 56 is denoted by $E_1$ whereas the voltage reading of meter 57 is denoted by $E_2$.

The anode of diode 50 is connected to the plus terminal of current source 60 through the direct current meter 58 and extremely high resistor 59 of adjustable magnitude. The negative terminal of the direct current source is connected to the cathode of diode 70.

The current source 60 passes direct current through the variable resistor 59 and the two diodes 50 and 70 in series. The magnitude of resistor 59 can be so chosen that any desirable current from zero to a relatively high value will flow in this circuit, and will be indicated by the direct current meter 58. It should be emphasized that in this circuit connection, which is purely illustrative of a principle, both the voltage of battery 60 and the value of resistor 59 are assumed to be so high that any changes in the voltages $E_1$ and $E_2$ do not alter the direct current, which flows through both diodes in series, and is indicated by meter 58. The circuit is so arranged that alternating current potentials of any desired magnitude may be introduced at input windings 51 and 53 respectively. These like windings are tightly coupled to the respective like secondary windings 71 and 71' without cross coupling.

With some finite direct current flowing in the circuit, but with no alternating current potentials introduced at windings 51 and 53, there will for all intents and purposes be zero direct current potentials indicated by meters 56 and 57. If, however, energy is introduced at winding 51, which may be at an intermediate radio frequency, meter 56 will indicate a direct current potential, with point 55 being positive with respect to point 54. If the magnitude of the alternating current energy introduced at winding 51 is varied, it will be found that the reading of the voltmeter 56 will be, for all practical purposes, proportional to the amplitude of the alternating current energy introduced. If, now energy is introduced at both windings 51 and 53, direct current potentials will be indicated by both meters 56 and 57. Furthermore, the potentials indicated by meters 56 and 57 will be in direct proportion to the amplitudes applied at windings 51 and 53. For all of these different conditions the total direct current which must be the same in each diode has been assumed to remain at a constant fixed value indicated by direct current meter 58.

If, now, the resistance 59 is changed in magnitude so that a new value of current, indicated by meter 58 flows through the two diodes 50 and 70 in series, but the applied energy at windings 51 and 53 remains the same, voltmeters 56 and 57 may indicate new potentials which, however, will still maintain a ratio equal to the ratio of the applied energy of windings 51 and 53.

Figure 4:
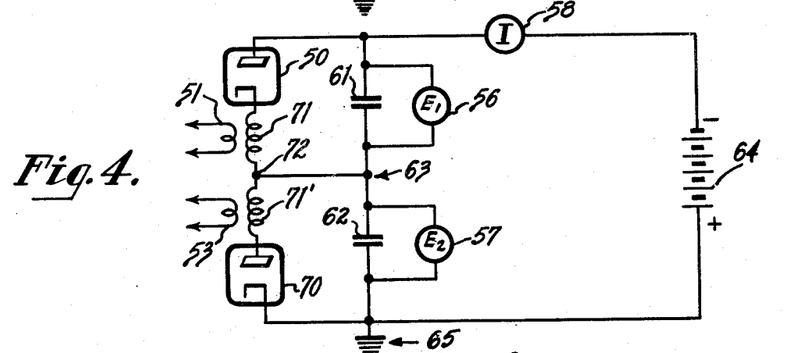

In Fig. 4 the battery 64, a constant direct current voltage source, replaces the constant direct current source (that is, battery 60 and resistor 59) of Fig. 3. It will be observed that the polarly of the battery 64 has been reversed. The negative terminal of source 64 is connected directly to the anode of diode 50, and the positive terminal of source 64 is connected directly to the cathode of diode 70. Under these conditions, no direct current would flow through meter 58 unless the energy introduced at windings 51 and 53 is sufficient to cause peak conduction through one or the other, or both, of diodes 50 and 70. This means that the sum of the peak instantaneous values of alternating current potentials supplied through windings 71 and 71' must be greater than the direct current potential of battery 64. If this condition holds, rectification will take place, and current will be indicated by meter 58. Likewise, voltmeters 56 and 57 will indicate direct current potentials, and these will be in direct ratio to the magnitudes of the respective energies applied at windings 51 and 53. Also, the sum of $E_1+E_2$ must always be equal to the D. C. voltage of battery 64.

Assume for the moment that these two applied signals are equal, and that their sum is just sufficient to cause conduction in the diodes which are biased back by battery 64. Then the readings of meters 56 and 57 will be equal. Assume, now, that the energies applied at windings 51 and 53 are both doubled, but still kept equal. Under this condition the diodes 50 and 70 will conduct over a much greater phase angle, i. e. larger portion of the alternating current cycle than in the former case, and the total direct current flowing through both diodes may be many-fold greater. Thus, the internal voltage drops in the rectifiers and in other alternating current circuit impedances will be accentuated. However, since $E_1$ and $E_2$ are still equal to each other, and their sum is equal to the battery voltage 64, no change in the direct current potential of point 63 results.

If, now, the proportion of the energies applied at 51 and 53 is altered so that twice as much is introduced at winding 51 as at winding 53, then voltmeter 56 will read two-thirds and meter 57 will read one-third of the battery voltage. It must be borne in mind that the sum of voltages $E_1$ and $E_2$ must always be equal to the total direct current voltage of current source 64. If the condition were reversed, that is the energy applied at winding 53 were twice that applied at 51, then voltmeter 57 would read two-thirds and voltmeter 56 one-third of the direct current voltage of battery 64. If, now, the applied energies are cyclically varied between the limits enumerated above, that is one decreases as the other increases, the potential of point 63 will vary cyclically with respect to ground point 65 between one-third and two-thirds of the potential of source 64.

In Fig. 4 it should, also, be pointed out that if the signals at windings 51 and 53 are instantaneously increased, but still maintain their same ratio (which would be the case in a ratio detector if the interfering impulse arrived in additive phase) no disruption of the cyclic swing of point 63 will occur. This is due to the fact that the sum of voltages $E_1$ and $E_2$ is maintained constant, and this sum will remain in direct proportion to the ratio of the applied signals as long as those applied signals are of sufficient total magnitude to cause diode conduction.

Figure 5:
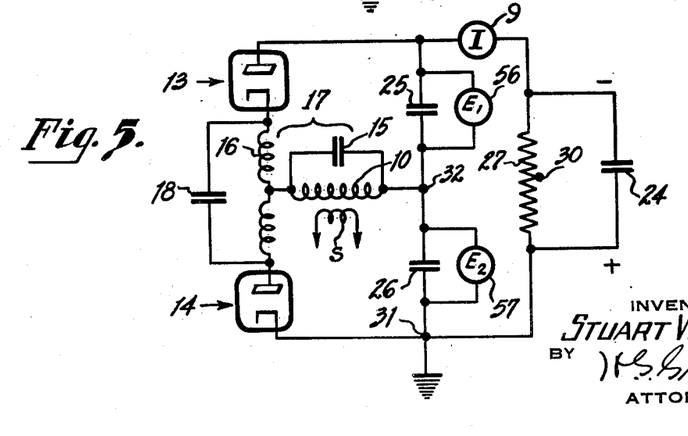

If current source 64 in Fig. 4 is replaced by a resistance, which in turn is bypassed with a very large condenser, the entire action is as described above. However, the direct current potential applied will now be a function of the average value of the signals applied at windings 51 and 53. This action is illustrated in the diagram of Fig. 5, explanation of which will also apply to Fig. 1. Accordingly, the reference numerals employed in Fig. 5 corresponds to the circuit numerals of Fig. 1.

In Fig. 5 the signal energy is applied from the single winding S. However, as explained previously in connection with Fig. 6a, it can be understood that the ratio of the energies applied at diodes 13 and 14 will be a function of the frequency of the signal energy at winding S. Likewise, the sum of the voltages $E_1$ and $E_2$ across condensers 25 and 26, which must be equal to the total voltage across the resistor-capacitor combination 27, 24, will be a function of the average amplitude applied at winding S. Then if the applied signal is frequency modulated the potential of point 32 with respect to ground will vary in accordance with the frequency modulation.

It will be observed that Fig. 5 involves like principles of operation to Fig. 4. Potential built up by the received signal energy across resistor 27 is similar in polarity and effect to the voltage of source 64. An intermediate frequency or other frequency modulated carried wave impressed at S on the circuit of coil 10—the latter acting as a primary in the reference to secondary 16— creates, as heretofore explained in reference to Fig. 6a, cyclically-varying voltages on diodes 13 and 14. Such voltages correspond to the voltages impressed at 71 and 71' in Fig. 4. The total voltage in the secondary circuit 16, 18 of Fig. 5 corresponds further to the sum of the voltages impressed upon secondary windings 71 and 71' of Fig. 4. In both Figs. 4 and 5, the direct current passing in series through the diodes will change in accordance with the amplitude of the total energy impressed upon the circuits at 71, 71' or 16, 18 respectively. Fig. 3 serves to show that the ratio of the derived voltages $E_1$ and $E_2$ may be unaffected by changes in the direct current passed through such series-connected diodes. This is also true of Fig. 4, in which the sum of the rectified voltages $E_1$ and $E_2$ is held constant by battery 64, although the current in series through the diodes may vary. Accordingly, direct current potentials across two diodes in series, such as diodes 50 and 70, Fig. 4, or 13 and 14, Figs. 1 and 5, each passing the same direct current, may be in the same ratio as the alternating current energies applied to the respective diodes, and may be substantially unaffected by changes in the amplitude of the direct current. The action of my present invention and of the invention described in my aforesaid application, Serial No. 599,343, both of which make use of these principles, may be called "ratio detection."

In Fig. 6a, as stated previously, I have shown the manner in which the vector voltages applied to diodes 13 and 14 will vary with modulation. In Fig. 6b, I have shown the corresponding vectors of an interfering signal which may be one or two channels removed. Fig. 6b, also, represents the vector voltages of a desired signal when tuned to one side of resonance. It will be noted in Fig. 6b that the phase of the secondary vectors has been rotated almost to its extreme, and that frequency modulation in this "off-tune" position of the signal causes little or no change in the relative vector potentials applied to diodes 13 and 14. However, as such an interfering or "off-tune" signal is modulated, it tends to ride up and down on the side of the selectivity curve of the receiver and thereby becomes endowed with a large measure of amplitude modulation. Since, however, the detector described herewith produces output only in the presence of a variation of the ratio of the two applied signals, little or not output from such an interfering or "off-tune" signal results. I have demonstrated this action of the present detector circuit in decreased interferences from adjacent channel signals, and in the markedly reduced side responses as the desired signal is tuned off resonance.

Suppose now that during the cyclic process, which has heretofore been described in reference to Fig. 4 and which, for the sake of example, may be assumed to occur at at rate of 400 cycles per second, both the energies introduced at winding 51 and 53 are instantaneously removed for a very short period of time and then restored. During that very short interval conduction through the diodes 50 and 70 will stop, and point 63 will remain at whatever potential it had assumed at the instant the input signals were removed and until they are again applied. This, of course, assumes that voltmeters 56 and 57 have infinitely high resistance so that they cannot discharge the bypass condensers 61 and 62.

Accordingly, Fig. 4 and the explanation thereof illustrates a second principle of this present "ratio detector," which makes its operation more desirable than the use of differential amplitude detection of the two applied signals as disclosed in the detector of my aforesaid patent. Stated in simple words, if for some reason the applied signals suddenly go to zero (for example, there may exist a beating interference noise component) the present detector tends to maintain the same D. C. output potential it had assumed before the signal was removed, and it does this rather than return to the zero or average potential as it does in the conventional and known limiter-discriminator combination.

The following illustrative constants are provided for the circuit of Fig. 1, assuming an I. F. of 8.25 mc. These values are in no way restrictive, but have been employed in successful operation of my invention. Coils S and 10 may each be (approximately 15 microhenrys) solenoids wound one on top of the other to get maximum coefficient of coupling.

$C_{15}$=25 mmf. (total)
$C_{18}$=75 mmf.
$C_{25}, C_{26}$=0.005 mf. each
$C_{24}$=8 mf.
$L_{16}$=5 microhenries
$R_{27}$=30,000 ohms The values chosen for condensers $C_{25}$ and $C_{26}$ will produce a degree of attenuation of high audio frequencies relative to lower audio frequencies.

The time constant of any network from point 32 to the single direct current path, in the absence of conduction in either diode, is preferably long compared to the period of modulation frequencies. Further, the time constant of the network comprising condenser 24, the conductive impedances of the diodes as supplied by the discriminator voltages and the resistance of resistor 27, is long compared to the period of the desired modulation frequencies.

Figure 7:
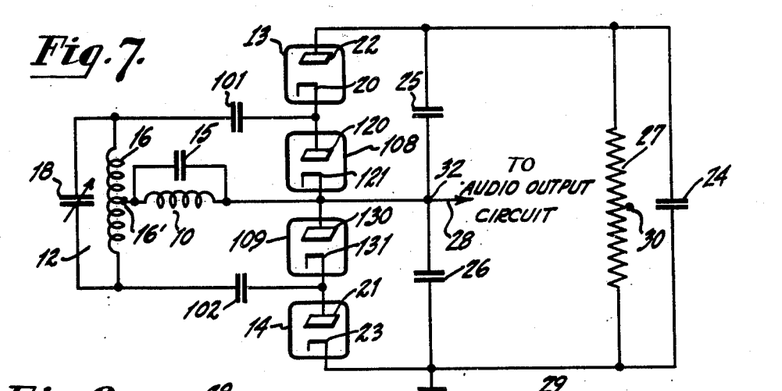
Fig. 7 shows a modified embodiment of the invention.

A further modification of my invention is shown in Fig. 7. This circuit utilizes four diodes rather than two, and serves to maintain a more accurate balance in cases where harmonics of the applied FM signal energy are present to any marked degree. In this circuit I. F. by-pass condensers 101, 102, 25 and 26 are all of the same capacity. The modulation frequency voltage output is taken off between the junction point 32 and ground, or between that junction point 32 and midpoint 30 of the resistor 27 in which case the double modulation frequency by-passing shown in Fig. 2 is desirable. It will be understood that the circuit of Fig. 7 is generally similar to that shown in Fig. 1 except that diodes 108 and 109 have been added, and condensers 101, 102 are inserted in the leads to cathode 20 and anode 21 respectively.

I have found that care is necessary in all circuits using two diodes both to prevent the application of excessive amounts of the even harmonics of the applied signal energy, and to furnish like impedance paths for such harmonics as are developed in the two diodes in order that a minimum of even harmonic potentials appear across the diodes. This is due to the fact that such even harmonics produce dissymmetry of the positive and negative peaks of the applied waves. Then, since half-wave rectifiers (13, 14) only are used to rectify the two signal voltages developed by the discriminator input network, and the two voltages are rectified in opposite phase, the harmonic peaks tend to cause one diode to conduct more than the other and thus disturb the balance potential of the modulation frequency voltage take-off point. In the circuit of Fig. 7 employing the four diodes, each of the two developed vector potentials is rectified in both its positive and negative phases, and thus dissymmetry of the applied wave form cannot result in an unbalance in the output potential.

It should be noted that in this circuit each of the output potentials (which when added together are equal to the sum of the substantially fixed voltage across the resistor 27 and condenser 24) is made up of the drop across two diodes. Thus, one pair of diodes consists of diode 13 and diode 108, while the other pair consists of diodes 14 and 109. By reason of the connection of condenser 101 between diodes 13 and 108 of one pair and of the condenser 102 between the diodes 109 and 14 of the other pair, one of each pair of diodes rectifies the positive swing of the applied signal wave, and the other diode rectifies the negative swing of the wave. Thus, the drop across the two diodes, for instance 13 and 108, may not be alike in the presence of an applied wave distorted by harmonics. However, under the condition of the application of a wave on the mean or center frequency, the total drop across diodes 13 and 108 is bound to be equal to the sum of the drops across diodes 109 and 14. In this manner, the action of harmonic distortion is completely balanced out.

The additional diode rectifiers 108 and 109 are inserted in the circuit as shown in Fig. 7. Thus, diode 108 has its anode 120 connected to cathode 20, while the cathode 121 of diode 108 is connected to the low potential end of coil 10. Diode 109 has its anode 130 connected to the cathode 121 of diode 108, while its cathode 131 is connected to the anode 21 of diode 14. The condenser 101 is connected to the junction of cathode 20 and anode 120 and the condenser 102 is connected to the junction of cathode 131 and anode 21. It will be observed that a single direct current path includes the space currents of all the four diodes and resistor 27, and that such path carries substantially all the unidirectional current which flows through the rectifier diodes. The resistor 27 is preferably given a value of 120,000 ohms in this case, since it is included in a voltage quadrupling circuit.

Figure 8A:
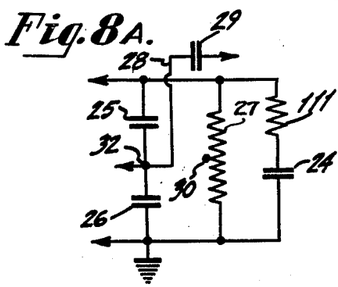
Figs. 8A and 8B show respectively further modifications of the external single direct current circuit.
Figure 8B:
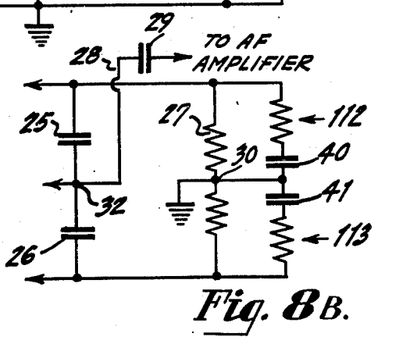

Further modifications of the FM detector circuit are shown in Figs. 8A and 8B. These show only the external voltage maintaining portions of the single direct current paths for any of the detector circuits, either double or quadruple diode, and are made up of resistive and capacitive components which, as previously described, are normally relatively immune to direct current potential changes at a rate approximating the period of a useful modulation frequency. Fig. 8A shows the external direct current network of Fig. 1, and Fig. 8B corresponds to the external network shown in Fig. 2. However, in each of these cases resistance has been added in series with the modulation frequency bypass condensers. These resistors 111, in Fig. 8A, and 112 and 113 in Fig. 8B, are usually small compared to the resistor 27, and their proper sizes can be determined in accordance with the method described below.

Figure 9A:
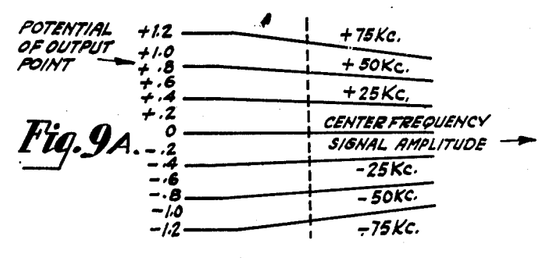
Figs. 9A and 9B are illustrative of the action of the modifications of Figs. 8A and 8B.

Referring, first, to Fig. 9A, the latter presents a graphical representation of the variation in the potential of the modulation output point with respect to the center point (30) on the resistive element (27) of the single direct current circuit path. These curves can be graphically reproduced on an oscilloscope by applying a sine wave voltage to the horizontal deflection plates, and utilizing that sine wave for 100% amplitude modulation of a carrier signal. The signal is, in turn, applied through an amplifier, if necessary, to the input of any of the angle modulation detection circuits shown herein. Then, the vertical plates are connected through a direct current amplifier to the modulation voltage output point of the detector system and the midpoint 30 of the resistance 27. Now if the applied signal, which is being 100% amplitude modulated, is altered in frequency to correspond to the values shown on the graph, the family of curves of Fig. 9A will be reproduced successively on the face of the tube. It will be noticed that these curves converge at the right hand side, or in regions of high amplitude. This is caused by the increased damping of the diodes, when subjected to increased signals, on the phase shift, or secondary, circuit of the discriminator. This increased damping decreases the rotation of the secondary vector voltage, and thereby decreases the difference between the two output voltages whose sum is equal to the so-called source voltage.

Figure 9B:
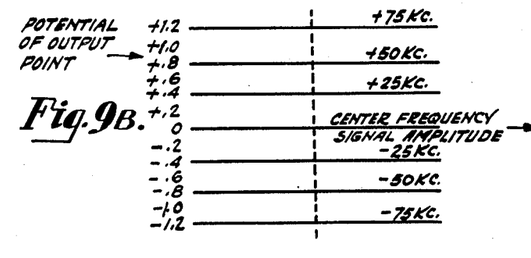

If, now, the resistor 111 of Fig. 8A, or the resistors 112 and 113 of Fig. 8B, are inserted as shown, the total source voltage across the resistor-condenser combination in the direct current path is allowed to increase under the stress of increased signals, and, thus, even though the damping of the phase shifting circuit is not lessened, the two output voltages are both increased and the difference is correspondingly increased. This tends to maintain the output potential constant for any applied frequency in the presence of amplitude modulation as shown in the curves of Fig. 9B. It can readily be seen that if the dashed vertical lines of Fig. 9A and Fig. 9B represented the mean amplitude of an incoming signal whose frequency was being modulated between the limits of +75 kc. and −75 kc., then extraneous amplitude variations would cause extraneous output in an angle modulation detector with the characteristics shown by Fig. 9A, but would not cause extraneous output in such detector when supplied with the aforementioned resistors and whose characteristics are as indicated in Fig. 9B.

The value of these series resistors for any given circuit will depend upon many factors, such as the tuned impedance of the discriminator tuned circuit, the degree of coupling between them, the conductive resistance of the diodes, and many others. I have, therefore, found that in practice it is desirable to reproduce the family of curves as shown in Fig. 9A and Fig. 9B, and alter the value of the resistor 111, or resistors 112 and 113, until the flat linearity of Fig. 9B results. I have found that in a circuit as shown in Fig. 7, when the resistor 27 was 120,000 ohms, the use of a resistor 111 (Fig. 8A) from a few hundred ohms up to 20,000 ohms was desirable, depending upon variation in the factors enumerated above. It will be understood that the modification shown in Fig. 8A may be applied to Fig. 1 or Fig. 7, while the modification of Fig. 8B may be applied to either Fig. 2 or to Fig. 1 or Fig. 7 when modified as indicated in Fig. 2.

While I have indicated and described several circuits for carrying my invention into effect, it will be apparent to one skilled in the art that my invention is by no means limited to the particular circuit organizations shown and described, but that many modifications may be made without departing from the scope of my invention.

What I claim is:

1. In combination with a source of angle modulated carrier waves, electrical circuit elements for deriving from the source of waves a pair of signal voltages whose relative magnitudes are dependent upon the angular modulations of the waves, at least two rectifiers, electrical circuit elements for applying each of said pair of voltages to a respective rectifier, additional circuit elements acting with said rectifiers and said first and second mentioned circuit elements to provide a single direct current path which carries substantially all the direct current which flows through either rectifier, and connections to said electrical circuit elements for deriving modulation frequency voltages therefrom.

2. In combination with a source of angle modulated carrier waves, means for deriving from the waves a pair of signal voltages whose relative magnitudes are dependent upon the angular modulations of the waves, at least two rectifiers, means for applying each of said pair of voltages to a respective rectifier, additional rectifier circuit elements acting with said hereinbefore-mentioned means to provide a single direct current path which carries substantially all the direct current which flows through either rectifier, and means for deriving modulation frequency voltage from across at least one of the rectifiers.

3. In combination, a source of frequency modulated signals, a discriminator therefor comprising electrical circuit elements for deriving from said source of frequency modulated signals two amplitude-modulated signal voltages whose relative magnitudes depend upon the frequency modulations, a pair of diode rectifiers, means connecting the anode of one rectifier and cathode of the second to predetermined points of said discriminator, a condenser of low impedance to modulation frequency currents connecting the cathode of said one rectifier to the anode of the second rectifier, a pair of series-connected condensers in shunt to said first condenser, said pair of condensers having low impedance to signal currents, said discriminator having a connection to the junction of said pair of condensers, and means for deriving modulation voltages from said junction of the pair of condensers.

4. In combination with a source of angle modulated carrier waves, means for deriving from the waves a pair of signal voltages whose relative magnitudes are dependent upon the angular modulations of the waves, at least two rectifiers, means on the input sides of the rectifiers for applying each of said pair of voltages to a respective rectifier, additional circuit elements acting with said rectifiers and the hereinbefore-mentioned means to provide a single direct current path which carries substantially all the direct current which flows through either rectifier and which includes an impedance on the output side of the rectifiers, and shunt condensers connected to said rectifiers and across said impedance and determining a point at which modulation frequency voltage may be taken off, said condensers and said impedance being of such values that in response to momentary removal of the applied signal voltages, the modulation voltage output point is maintained at the potential it had assumed prior to the removal.

5. In combination, a source of frequency modulated waves, a discriminator therefor, a pair of diode rectifiers, means connecting the anode of one rectifier and cathode of the second to predetermined spaced points of said discriminator, a condenser of low impedance to modulation frequency currents connecting the cathode of said one rectifier to the anode of the second rectifier, a resistor in shunt with the condenser, a second condenser of low impedance to said waves connected from a point on said discriminator to one side of said first condenser, and means for deriving modulation voltage from across the second condenser.

6. In combination with a source of angle modulated carrier waves, means for deriving from the waves a pair of signal voltages whose relative magnitudes are dependent upon the angular modulations of the waves, at least two rectifiers, means for applying each of said pair of voltages to a respective rectifier, an additional rectifier operatively associated with a respective one of said two rectifiers, each additional rectifier rectifying the applied signal voltage in opposite phase to that of its respective one of said two rectifiers, and a single direct current path carrying substantially all of the direct current which flows through all of said rectifiers.

7. In combination with a source of frequency modulated carrier waves, means for deriving from the waves a pair of signal voltages whose relative magnitudes depend upon the frequency modulations of said waves, a pair of rectifiers each having at least an anode and a cathode, means for applying each of said pair of voltages to a respective rectifier, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents in which all of the direct current which passes through either of the rectifiers also passes through the other rectifier, a resistance in one of said circuits, means for establishing across said resistance a direct current potential substantially fixed against modulation frequency variations, and means connected between said circuits for deriving therefrom modulation-frequency voltage variations developed on one of said circuits in relation to the other.

8. A detector for frequency modulated waves comprising a source of frequency modulated carrier waves, a discriminator network for deriving from the waves a pair of signal voltages whose relative magnitudes are dependent upon the frequency modulations of said waves, a pair of rectifiers each having at least an anode and a cathode, connections for applying each of said pair of voltages to a respective rectifier, said connections and said discriminator providing a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents in which all of the direct current which passes through either of the rectifiers also passes through the other rectifier, a resistance in said second circuit, a condenser for establishing across said resistance a direct current potential substantially fixed against modulation frequency variations, and load impedance connected between said circuit across which may be derived modulation-frequency voltage variations developed on one of said circuits in relation to the other.

9. A detector comprising a pair of rectifiers each having at least an anode and a cathode, means for impressing on the respective rectifiers carrier frequency voltages varying in amplitude in opposite senses and at modulation frequencies, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents in which all of the direct current which passes through one of the rectifiers also passes through the other, an impedance in one of said circuits, and means for establishing across said impedance a direct current potential substantially fixed against modulation frequency voltage variations, the desired modulation frequency voltage variations being developed on one of said circuits in relation to the other.

10. A detector comprising a pair of rectifiers each having at least an anode and a cathode, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents in which all of the direct current which passes through one of the rectifiers also passes through the other, means for applying modulated carrier waves to the respective rectifiers, means in one of said circuits for establishing a direct current potential substantially fixed against modulation frequency variations, and means for deriving modulation-frequency voltage variations from one of said circuits in relation to the other.

11. In combination with a vacuum tube amplifier for frequency modulated carrier waves, means for deriving from the waves a pair of signal voltages whose relative magnitudes are dependent upon the frequency modulations of said waves, a pair of rectifiers each having at least an anode and a cathode, means for applying each of said pair of voltages to a respective rectifier, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, in which all of the direct current which passes through one of the rectifiers also passes through the other rectifier, a resistor in one of said circuits, and means for establishing across said resistor a direct current potential varying with the average strength of the voltages applied to the rectifiers, substantially fixed against modulation frequency variations, and suitable for automatically controlling the gain of said amplifier.

12. In combination with a source of angle modulated carrier waves, a discriminator arrangement of reactance elements for deriving from the waves a pair of signal voltages whose relative magnitudes are dependent upon the modulations of said waves, a pair of rectifiers each having at least an anode and a cathode, connections for applying each of said pair of voltages to a respective rectifier, said discriminator and said connections constituting a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, a resistor in said second circuit, means for establishing across said resistor a direct current potential substantially fixed against modulation frequency variations, two condensers of substantially equal capacity connected in series across the terminals of said second circuit and in parallel with said resistor, and a modulation-frequency output lead connected to a point between said condensers for deriving modulation-frequency voltage variations from one of said circuits in relation to the other.

13. A frequency modulation detector comprising a pair of rectifiers each having at least two electrodes, a discriminator for obtaining from a source of frequency-modulated waves two voltages dependent upon the frequency modulations of said waves, said discriminator comprising a circuit including inductance and capacity and tuned substantially to the center frequency of said waves, wiring connections for impressing each of said voltages on a respective one of the rectifiers, a resistance connected between the electrodes of the rectifiers other than those upon which voltages are impressed by said wiring connections and having one of its terminals grounded, a condenser across said resistance for establishing the potential thereacross against substantial variation at modulation frequencies, two additional condensers connected in series across the last-mentioned electrodes of said rectifiers and in parallel with said resistance, one terminal of one of said last-mentioned condensers being connected to the grounded end of said resistance and the other terminal of said last-mentioned condenser being connected to the inductance in said tuned circuit, whereby said last-mentioned condenser acts to ground the tuned circuit for frequency-modulated waves, and connections for taking off voltage variations of modulation frequency from across the terminals of the last-mentioned condenser.

14. In combination with a source of angle modulated carrier waves, a discriminator arrangement of reactance elements for deriving from the waves a pair of signal voltages whose relative magnitudes are dependent upon the modulations of said waves, a pair of rectifiers each having at least an anode and a cathode, connections for applying each of said pair of voltages to a respective rectifier, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents, a resistor in said second circuit, a condenser of large capacity connected across said resistor for establishing and maintaining direct current potential substantially fixed against modulation frequency variations, additional condensers connected in series across the terminals of said second circuit and in parallel with said resistor, said last-mentioned condensers being of such value as to have negligible impedance to the angle modulated carrier waves and to attenuate the high modulation frequencies more than lower modulation frequencies, and a lead connected to a point between said condensers and to said discriminator arrangement from which modulation-frequency voltage variations may be derived.

15. In a detector comprising a pair of rectifiers each having at least an anode and a cathode, electrical connections for applying to said rectifiers carrier frequency voltages varying in amplitude cyclically and in opposing senses at a modulation frequency rate, said connections including a circuit connecting the anode of one rectifier to the cathode of the other, a second circuit connecting the cathode of the first-mentioned rectifier to the anode of the second-mentioned rectifier, a resistor in said second-mentioned circuit, means for establishing across said resistor direct current potential substantially fixed against modulation frequency variations, and means connected between said circuits for deriving therefrom modulation-frequency voltage variations developed on one of said circuits in relation to the other, the improvement which consists in connecting said circuits in series with said rectifiers in a closed loop for flow of uni-directional currents in which all of the direct current which passes through either of the rectifiers also passes through the other rectifier.

16. In a detector for frequency modulated waves comprising a discriminator network for deriving from frequency modulated carrier waves a pair of signal voltages whose relative magnitudes are dependent upon the frequency modulations of said waves, a pair of rectifiers each having at least an anode and a cathode, connections for applying each of said pair of voltages to a respective rectifier, said connections and said discriminator network providing a circuit connecting the anode of one rectifier to the cathode of the other, a second circuit connecting the cathode of the first-mentioned rectifier to the anode of the second-mentioned rectifier, a resistance in said second circuit, and a condenser of large capacity for establishing across said resistance a direct current potential substantially fixed against modulation frequency variations, the improvement which consists in connecting said circuits in series with said rectifiers in a closed loop for flow of uni-directional currents in which all of the direct current which passes through either of the rectifiers also passes through the other rectifier, in connecting two additional condensers in series between the cathode of the first-mentioned rectifier and the anode of the second-mentioned rectifier, and in connecting the discriminator network circuit to a point between said last-mentioned condensers, whereby said last-mentioned condensers provide a load impedance connected between said circuits across which may be derived modulation-frequency voltage variations developed on one of said circuits in relation to the other.

17. A frequency modulation detector comprising a pair of rectifiers each having at least two electrodes, a discriminator for obtaining from a source of frequency-modulated waves two voltages dependent upon the frequency modulations of said waves, said discriminator comprising a primary circuit and a secondary circuit including inductance and capacity and tuned substantially to the center frequency of said waves, wiring connections for impressing one of said voltages directly on the anode of one of said rectifiers and the other of said voltages directly on the cathode of the other rectifier, a resistor connected between the electrodes of the rectifiers other than those upon which voltages are directly impressed by said wiring connections and having one of its terminals grounded, a condenser across said resistor for establishing the potential thereacross against substantial variation at modulation frequencies, two condensers connected in series across the last-mentioned electrodes of said rectifiers and in parallel with said resistor, one terminal of one of said last-mentioned condensers being connected to the grounded end of said resistor and the other terminal of said last-mentioned condenser being connected through said primary circuit to substantially the midpoint of the inductance in said tuned circuit, whereby said last-mentioned condenser acts to ground the primary circuit for frequency-modulated waves, and connections for taking off voltage variations of modulation frequency from across the connection between the mid-point of the discriminator inductance and ground.

18. A frequency modulation detector comprising a pair of rectifiers each having at least two electrodes, a discriminator for obtaining from a source of frequency-modulated waves two voltages dependent upon the frequency modulations of said waves, said discriminator comprising a circuit including inductance and capacity and tuned substantially to the center frequency of said waves, wiring connections for impressing each of said voltages on a respective one of the rectifiers, resistance connected between the electrodes of the rectifiers other than those upon which voltages are directly impressed by said connections, said resistance being grounded at an intermediate point thereof, capacitive means connected across said resistance for establishing the potential thereacross against substantial variation at modulation frequencies, two additional condensers connected in series across the last-mentioned electrodes of said rectifiers and in parallel with said resistance, a lead connecting the inductance in said tuned circuit to a point between the last-mentioned condensers, and connections for taking off voltage variations of modulation frequency from said connecting lead.

19. A detector according to claim 18 in which the resistance is grounded at substantially the mid-point thereof.

20. A detector according to claim 18 in which the resistance is grounded at substantially the mid-point thereof and the capacitive means connected across the resistance for establishing the potential thereacross against sustantial variation at modulation frequencies consists of two condensers connected in series across said resistance, each having negligible impedance to modulation frequencies and the connection between them being grounded.

21. A detector comprising rectifying means having input and output circuits, said circuits in series with said rectifying means providing a single direct current path, means for applying modulated carrier waves to the rectifying means, means in one of said circuits for establishing a direct current potential substantially fixed against modulation frequency variations, and means for deriving modulation-frequency voltage variations from one of said circuits in relation to the other.

22. In a demodulator of angle-modulated waves, two rectifiers each having at least an anode and a cathode arranged in series for flow of direct current, means including a common input circuit also connected in series with the rectifiers for flow of direct current for impressing modulated carrier frequency waves on said rectifiers, means including a resistance carrying substantially all of the direct current which flows through either of the rectifiers for establishing on one side of said rectifiers a direct current potential stabilized against voltage variations of modulating frequency, and connections across said rectifiers for deriving modulation frequency voltages from said demodulator.

23. A detector comprising a pair of rectifiers each having at least an anode and a cathode, a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of uni-directional currents in which all of the direct current which passes through either of the rectifiers also passes through the other rectifier, means for applying modulated carrier waves to the respective rectifiers, means in one of said circuits for establishing between terminals of the rectifiers and by anode-cathode currents produced by the modulated carrier waves a direct current potential substantially fixed against modulation frequency variations, and means for deriving modulation-frequency voltage variations from one of said circuits in relation to the other.

24. In a demodulator of angle-modulated waves, two rectifiers arranged in series for flow of direct current and each having at least an anode and a cathode, means for impressing modulated carrier frequency waves on said rectifiers, connections between the rectifiers for constituting with the rectifiers a closed loop for flow of direct current in which all of the direct current which flows through either of the rectifiers also flows through the other rectifier, means in the connections on one side of said rectifiers for establishing a direct current voltage varying in value in accordance with the average strength of the impressed modulated carrier waves and stabilized against voltage variations of modulating frequency, and connections across said rectifiers for deriving modulation frequency voltages from said demodulator.

25. In a demodulator of angle-modulated waves, two rectifiers arranged in series for flow of direct current and each having at least an anode and a cathode, means for impressing modulated carrier frequency waves on said rectifiers, connections between the rectifiers and including a portion of said impressing means for constituting with the rectifiers a closed loop for flow of direct current in which all of the direct current which flows through one of the rectifiers also flows through the other rectifier, a resistance and capacity in parallel with each other connected between the rectifiers to establish by anode-cathode currents produced by the modulated carrier waves a direct current voltage stabilized against voltage variations of modulating frequency, low impedance connections between said resistance and said rectifiers, and connections across said rectifiers for deriving modulation frequency voltages from said demodulator.

26. In combination with a source of angle-modulated carrier waves, means for deriving from the waves a pair of signal voltages whose relative magnitudes are dependent upon the modulations of the waves, said means including a primary circuit, a secondary circuit tuned to the carrier frequency and two couplings between the primary and secondary circuits, one of which transfers the angle-modulated waves to the secondary circuit without phase change and the other of which transfers angle-modulated waves to the secondary circuit with a voltage phase change dependent on the modulations of the waves, a pair of rectifiers each having at least an anode and a cathode, a direct current conducting circuit connecting the anode of one rectifier to the cathode of the other, a second direct current conducting circuit connecting the cathode of the first-mentioned rectifier to the anode of the second-mentioned rectifier, one of said direct current conducting circuits including said secondary circuit and connections for applying each of said pair of voltages to a respective rectifier and said direct current conducting circuits in series with said rectifiers constituting a closed loop for flow of uni-directional currents in which all of the direct current which flows through one of the rectifiers also flows through the other rectifier, resistance in one of said direct current conducting circuits, a large capacity in parallel with said resistance for establishing across it a direct current potential substantially fixed against audio frequency variations, and connections for deriving audio frequency voltages from across said rectifiers.

27. In a demodulator of angle-modulated waves, two rectifiers arranged in series for flow of direct current and each having at least an anode and a cathode, means for impressing modulated carrier frequency waves on said rectifiers, connections between the rectifiers for constituting with the rectifiers a closed loop for flow of direct current in which substantially all of the direct current which flows through either of the rectifiers also flows through the other rectifier, the connections on one side of the rectifiers including a resistance of the order of 30,000 ohms and a capacity of the order of 8 microfarads connected in parallel with each other between the rectifiers to establish a direct current voltage depending in value on the average strength of the impressed carrier waves and stabilized against voltage variations of modulation frequency, low impedance connections between said resistance and said rectifiers, and connections across said rectifiers for deriving modulation frequency voltages from said demodulator.

28. In combination with an amplifier for angle modulated waves, a discriminator for deriving from the waves a pair of signal voltages whose relative amplitudes are dependent upon the angular modulations of the waves, a pair of two-electrode rectifiers, connections for applying one of said voltages to one of said rectifiers and the other of said voltages to the other rectifier, circuits connecting said rectifiers in series-aiding polarity for direct current and providing with said rectifiers a single direct current path in which all of the direct current passing through one of the rectifiers also passes through the other rectifier, and a potential source constant against amplitude variations at modulation frequencies, said potential source allowing the sum of the rectified potentials to vary at a rate slower than useful modulation frequencies and being suitable for automatically controlling the gain of said amplifier.

29. In combination, a discriminator for angle modulated waves, said discriminator including a a secondary circuit for deriving from the waves a pair of voltages whose relative amplitudes are dependent upon the angular modulations of the waves, a pair of two-electrode rectifiers, two circuits connecting said rectifiers in series for direct currents and in a single direct current path in which all of the direct current passing through one of the rectifiers also passes through the other rectifier, one of said circuits including said discriminator secondary circuit and the other of said circuits including a potential source constant against amplitude variations at modulation frequencies but responsive to the average amplitude of the waves applied to the said primary circuit or the discriminator, and an output circuit for deriving modulation signal voltages from said circuits.

30. A detector for angle modulated waves including a pair of rectifiers each having an anode and a cathode, an input circuit for the rectifiers including a discriminator for deriving from the waves a pair of voltages whose relative amplitudes are dependent upon the angular modulations of the waves, a circuit connecting the anode of one of the rectifiers to the cathode of the other, another circuit connecting the cathode of the first-mentioned rectifier to the anode of the second-mentioned rectifier, said input circuit including connections for impressing the voltages derived by the discriminator upon the anode-cathode paths of the rectifiers and said last-mentioned circuits connecting said rectifiers in series for direct currents and in a single direct current path in which all of the direct current passing through one of the rectifiers also passes through the other rectifier, one of said last-mentioned circuits including at least a portion of said input circuit and the other of said last-mentioned circuits including a potential source constant against amplitude variations at modulation frequencies but responsive to the average amplitude of the waves applied to said input circuit, and an output circuit for deriving modulation signal voltages from the detector.

31. A detector for frequency modulated waves, a discriminator for deriving from the waves a pair of signal voltage whose relative amplitudes are dependent upon the frequency modulations of said waves, a pair of two-electrode rectifiers each having an anode and a cathode, connections for applying one of said signal voltages to one of the rectifiers and the other of said signal voltages to the other rectifier, said connections and said discriminator providing a circuit connecting the anode of one rectifier to the cathode of the other, a second circuit connecting the cathode of the first-mentioned rectifier to the anode of the second-mentioned rectifier, said circuits in series with said rectifiers constituting a closed loop for flow of unidirectional currents in which all of the direct current which passes through either of the rectifiers also passes through the other rectifier, a resistance in said second circuit, a capacity for establishing across said resistance a direct current potential substantially fixed against amplitude variations at modulation frequencies, an additional condenser connected between said circuits, and connections for taking off modulation frequency output voltage from across the last-mentioned condenser, said last-mentioned condenser being of low impedance to the frequency modulated waves supplied to the discriminator.

STUART W. SEELEY.

REFERENCES CITED

The following references are of record in the file of this patent:

UNITED STATES PATENTS

| Number | Name | Date |
|---|---|---|
| 2,173,231 | Koch | Sept. 19, 1939 |
| 2,190,319 | Koch | Feb. 13, 1940 |
| 2,312,070 | Bliss | Feb. 23, 1943 |
| 2,404,026 | Beard et al. | July 16, 1946 |